May 2, 1939.  V. MILLS  2,156,863
CONTINUOUS COUNTERCURRENT HYDROLYSIS OF FAT
Filed May 16, 1935
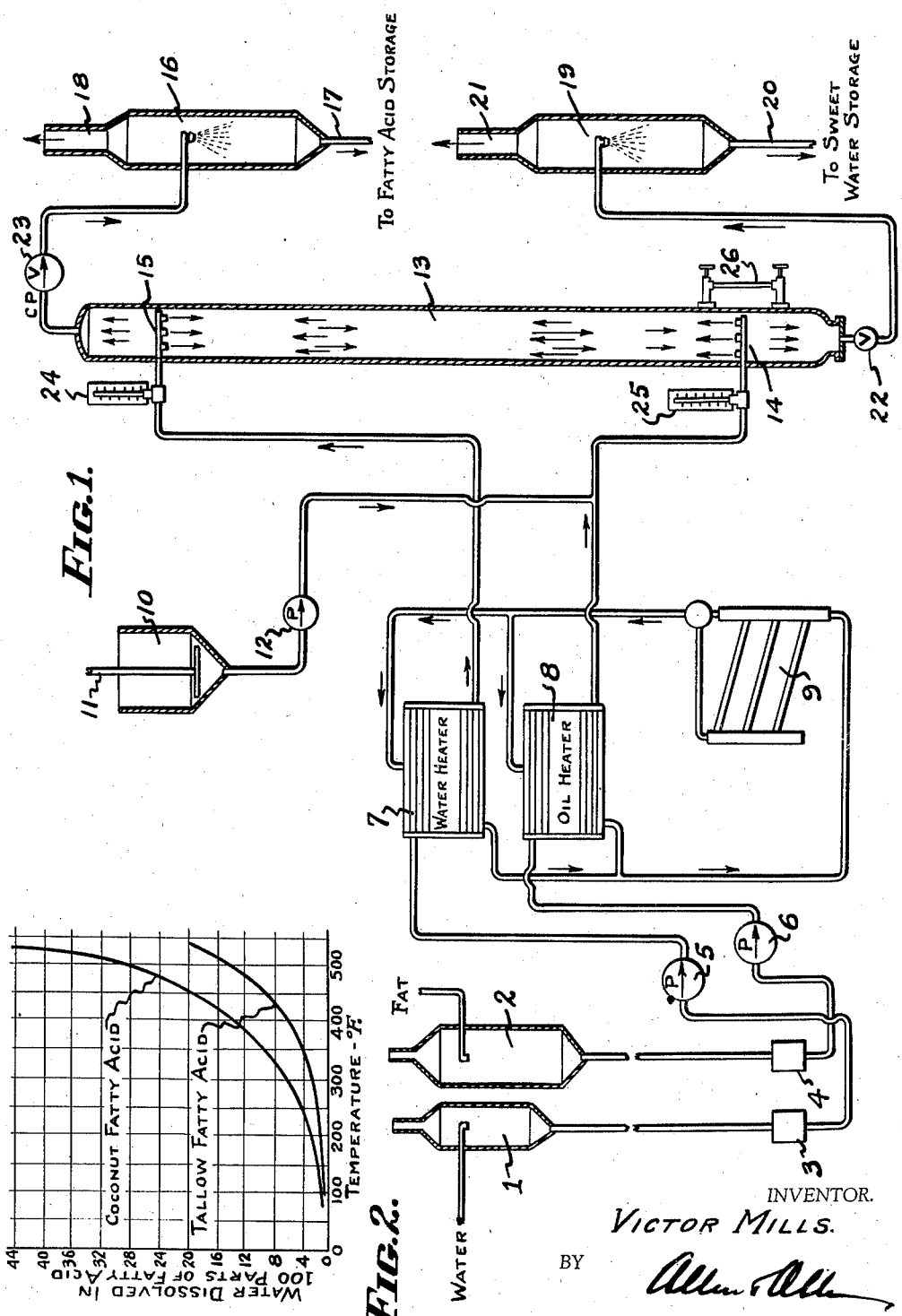
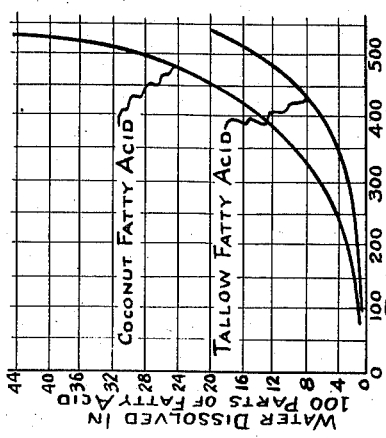
INVENTOR.
VICTOR MILLS.
BY
ATTORNEYS.

Patented May 2, 1939

2,156,863

UNITED STATES PATENT OFFICE 2,156,863

CONTINUOUS COUNTERCURRENT HYDROLYSIS OF FAT

Victor Mills, Cincinnati, Ohio, assignor to The Procter & Gamble Company, Cincinnati, Ohio, a corporation of Ohio Application May 16, 1935, Serial No. 21,845

18 Claims. (Cl. 260—415)

My invention relates to an improved continuous process for hydrolyzing or splitting saponifiable fats.

The objects of my invention are:

1. A higher percentage of split of the fat and a greater yield of glycerin than has heretofore been economically possible with existing methods.
2. A rapid rate of splitting.
3. To obtain from fats of reasonably good quality a superiod grade of fatty acids without the necessity of a subsequent distillation.
4. To obtain fatty acids of improved quality from lower grade fats so that with subsequent distillation of the fatty acids, a better quality of distilled product with a smaller amount of still bottoms or pitch will be produced.
5. To obtain glycerin in the form of a more concentrated "sweet water", thus reducing the glycerin recovery cost.
6. To operate continuously.
7. To secure greater economy in operation.
8. To reduce the amount of equipment and floor space necessary to treat a given amount of fat.

According to my invention I set up a continuous counter current flow of water and fat in a vertical closed passage or vessel at elevated temperature and under sufficiently high pressure to maintain the water in the liquid state, and continuously draw off fatty acid, and sweet water containing glycerin, after the action of water on the fat has been carried out to the desired extent.

In the particular operation which gives best results, I use preferably an autoclave so arranged that the point of introduction of water is substantially below the top thereof, and the point of introduction of the fat is substantially above the bottom thereof. Then by means of valves which will be set to maintain the desired rate of flow of the materials introduced while maintaining the desired pressure, I draw the fatty acid from substantially above the point of water introduction and the "sweet water", or glycerin containing water, from substantially below the point of fat introduction. I preferably employ a catalyzer which, if used, will preferably be introduced along with the fat.

I preferably heat the ingredients and set up the desired pressure thereon, prior to introduction into the autoclave, although with change in apparatus employed it might be possible to supply much of the heat to the several ingredients in the treatment apparatus itself.

I assign as the reason why my process produces the results that it does, as will be hereinafter set forth, the fact that water is dissolved in fats and fatty acids in considerable amount when the temperature is high and sufficient pressure is employed to prevent the water from boiling. Thus the bringing together of the fat and water, under conditions where large percentages of water may dissolve in the fat brings about an intimacy of contact of the molecules of water and fat which could never be obtained by agitation under conditions which do not cause a substantial amount of actual solution of water in the fatty matter. The length of time necessary for splitting the fat, i. e. effecting substantially complete hydrolysis, can be readily provided for by control of the length of the passage through which the substances pass while in contact with each other, and the rate of flow set up.

By fat, I mean any fatty glyceride whether at ordinary temperatures it is a liquid or a solid and by "fatty matter" I mean fat, oil, fatty acids, or any mixture of same.

In all previous practical processes for hydrolyzing fats in autoclaves with which I am familiar, it has been customary to heat the water and oil in batches during about four to twelve hours to a rather moderate temperature and pressure, usually not over 350° F. and 125 pounds per square inch, in the presence of a catalyst, and invariably with some kind of agitation, usually either mechanical or direct steam, in the endeavor to break up or emulsify the materials so as to increase the surface of contact, under the belief that it was the area of contact between the two materials that caused or facilitated the reaction, instead of the actual solution of one in the other which I have discovered to be the true motivating cause under my operating conditions. Furthermore, in all fat hydrolysis operations an equilibrium tends to take place between the liberated fatty acids and glycerin, beyond which no further splitting can occur. It then becomes necessary, in order to obtain a high degree of splitting, to remove the "sweet water" from the autoclave and replace same with a fresh charge of water and then to subject the partially hydrolyzed fat to a second treatment. Sometimes a third or even a fourth treatment is applied, but even under the best conditions the degree of splitting of the fatty acids as measured by the ratio of free fatty acids to total fatty acids in the fat rarely exceeds 96 to 98 per cent, and the concentration of the glycerin in the so-called "sweet water" rarely exceeds 15 per cent and is usually considerably below this point if a high degree of splitting is secured. When 100 parts of tallow, for example, is hydrolyzed with about 35 parts of water under ordinary operating conditions in a batch autoclave at a pressure of 125 pounds per square inch and at a temperature of 350° F., an equilibrium occurs when the splitting amounts to 90 per cent and the glycerin concentration in the water amounts to about 22 per cent. If, however, a larger portion of water is used so that the glycerin concentration in the "sweet water" reaches only 5 per cent, then a split of about 98 per cent is obtainable. This latter condition, however, is comparatively uneconomical because of the additional equipment required and the added expense involved in subsequently concentrating such a dilute glycerin solution for recovery of the glycerin.

In practice the operation is always stopped before these figures are reached because of the slowing down of the rate of reaction and the excessively long time required to reach the final equilibrium.

The hydrolysis reaction is reversible and may be expressed by the following equation:

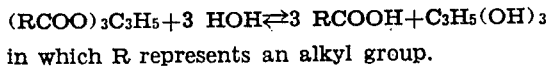

in which R represents an alkyl group.

While some attempts at continuous hydrolysis have been made, no commercially practical process has ever been developed as far as I am aware.

Referring to the accompanying drawing,

Figure 1 represents a diagrammatic elevation view of an apparatus suitable for the carrying out of my invention;

Figure 2 indicates graphically the solubility of water in fatty acids at different temperatures and is to be used in connection with formula hereinafter described for determining amount of water to use.

Referring to Figure 1, 1 and 2 are deaerators or deoxygenators of any suitable type for the water and fat respectively. 3 and 4 are meters for measuring the two fluids. 5 and 6 are pumps for forcing the water and fat through the apparatus at the desired pressure. 7 and 8 are heaters for water and fat respectively. 9 is a boiler or other device for supplying heating means to the heaters 7 and 8. 10 is a tank for supply of catalyst, in which is an agitator 11. 12 is a pump for delivering the catalyst into the fat. This pump preferably is so arranged as to act proportionally to the fat pump 6. 13 is a vertical autoclave chamber into which the fat is fed at a point near the bottom through distributing pipes 14 and water is fed into the top through distributing pipes indicated by 15. 16 is a tank for receiving the split fatty acids and flashing same to atmospheric pressure. The fatty acids are discharged through pipe 17, and the water vapor through pipe 18. 19 is a tank for receiving the "sweet water", into which it may be flashed to atmospheric pressure. The sweet water then is discharged through pipe 20, and the water vapor through pipe 21. 22 is a valve for suitably regulating the rate of discharge of the "sweet water", and 23 is an automatic pressure control valve on the fatty acid discharge. 24 and 25 are thermometers, respectively in the water and fat inlet pipes to the autoclave 13. 26 is a liquid level gage to show the level of the interface between fat and water in the autoclave. The different parts of the apparatus are suitably connected by pipes as shown and provided with additional valves where needed to properly regulate the flow of the fluids. The autoclave 13 and other parts of the apparatus coming in contact with split fatty acids should preferably be made of a material resistant to the corrosive action of fatty acids such as stainless steel for example. The autoclave as shown and described herein is about two feet six inches in diameter and fifty feet high, and well insulated externally to reduce losses of heat by radiation. It should be noted that there is a space at the bottom of the autoclave, below fat distributing pipes 14, which will permit the "sweet water" to settle and free itself from entrained globules of fat. The remainder of the autoclave contains fatty matter through which the water is constantly passing. At the top of the chamber or autoclave, above the water distributing pipes 15, is a similar space to permit the fatty acids to settle and free themselves substantially from entrained globules of water before leaving the apparatus. Of course when the pressure is reduced on the products as they leave the apparatus, with a consequent reduction of temperature, there will occur a separation of at least a portion of the water dissolved in the fatty acids and of the fatty acids dissolved in the glycerin solution, and at least a part of the water in each product will volatilize.

An exemplary operation of my process consists of the following. In starting up, the water is first passed through the deoxygenator 1, through the meter 3, pump 5 where the pressure is raised to any desired point between 150 and 1600 pounds per square inch, sufficient to maintain the heated water in the liquid phase at the temperature to which it is to be heated, while the pressure in the system is maintained by means of valve 22 (temporarily closed), and automatic pressure control valve 23, on the discharge from the autoclave 13.

The water next passes through the heater 7 where it is heated to the desired temperature, as explained later, and then passes into the autoclave 13 through the distributing pipe 15 until the autoclave is filled with water. The supply of water then ceases temporarily, and pumping of fat begins. The fat such as tallow in a molten state passes through the deoxygenator 2, meter 4, and pump 6 where its pressure is raised to substantially the same point as that of the water. The fat then passes through the heater 8 where its temperature is raised to about that of the water, and then it passes into the autoclave through distributing pipes 14. Any desired amount of catalyst is introduced into the fat by pump 12, preferably as the fat passes from the heater to the autoclave. The pumping of fat is continued without further addition of water until the autoclave is filled with fat above the level of the water distributing pipes 14, which can be determined by the use of a suitable liquid level gage 26, on autoclave 13. The water dispelled during this period of introducing the fat is allowed to escape through the control valve 22 at the water outlet at the bottom of autoclave 13, at the same rate as that of the fat introduced, while maintaining the desired pressure inside the autoclave to prevent the superheated water from boiling. The apparatus is now in condition for continuous operation.

Both fat and water are now supplied to the autoclave continuously at a steady rate. By supplying tallow at a uniform rate of about 7500 pounds per hour in an apparatus of this size, (about 1530 pounds of fat per hour per square foot of cross sectional area) and water at a rate of about 3500 pounds per hour, while maintaining a temperature of about 470° F. and a pressure of 600 pounds per square inch in the autoclave, the fat takes about one hour to pass through the autoclave, and is hydrolyzed to the extent of over 98 per cent, and usually about 99 per cent. The split fatty acids issue from the top of the autoclave through a suitable pressure controlling valve in a continuous stream. A more rapid passage of the fat and water through the described apparatus in the same relative proportions, taking for example 30 minutes instead of 60 minutes, would still give a high degree of hydrolysis, only a few per cent under that obtained in 60 minutes. The liberated glycerin is taken up by the water and leaves the bottom of the autoclave in a continuous stream in the form of a solution or "sweet water" which will contain approximately 24 per cent glycerin, if the original fat was of good grade, containing substantially its full complement of glycerin. In order to provide a rather prolonged contact of water with fat, the main body of the autoclave should preferably be kept filled with fat through which the water descends, and the interface between the fat and the accumulated "sweet water" should preferably be maintained in the apparatus described at a point about three feet above the bottom of the autoclave, or at about the level of the fat inlet 14. This level can be regulated by suitably controlling the flow of the fat and the water, and can be determined by use of suitable draw-off valves at various levels or by a liquid level gage.

The "sweet water" passes to the flash tank 16 where its pressure is released through a suitable valve to atmospheric pressure, whereby a portion of the water suddenly evaporates to steam with a resulting cooling effect so that the temperature drops to slightly more than 212° F. with a resulting concentration of the "sweet water" from a glycerin content of 24 per cent to approximately 32 per cent. Likewise, the split fatty acids issuing from the top of the autoclave pass to flash tank 16 where the pressure is reduced through a suitable valve to atmospheric pressure. The fatty acids while under the temperature and pressure stated, contain approximately 11 per cent of water in solution, which will entirely flash into steam when the pressure is reduced to atmospheric in the flash tank, with a resulting cooling effect on the fatty acids.

If cooled under other conditions wherein the dissolved water does not evaporate, it will then separate on further cooling and settling.

Both the fatty acids and the dissolved water in same are substantially free from glycerin when the operation is carried out as described in an autoclave column of sufficient height. Thus, in a column ten feet high, I find that the water which is dissolved in the issuing fatty acids contains about five per cent of glycerin; in a twenty foot column the water contains only about one per cent glycerin, while in a fifty foot column as described herein the water contains only about 0.1 per cent glycerin.

It is thus seen that I have a flowing column of molten fat of such high temperature and pressure as to promote the solubility of water in same, and that I continuously cause a substantial amount of water to dissolve in said flowing fat at the bottom of the column whereupon hydrolysis takes place with liberation of glycerin and formation of "sweet water" containing glycerin. As the fat progresses upwards through the chamber, hydrolysis proceeds, and the fat continuously meets a countercurrent of excess water descending, which apparently continuously interchanges with the dissolved "sweet water" in the fat with the result of continuously and progressively enriching the excess water in its glycerin content as it descends through the column, while at the same time the fat in its ascent through the chamber is progressively deprived of the glycerin, either combined or free, until finally on reaching the top of the column I have fatty acids substantially free from glycerin, and at the bottom of the column water containing a substantial percentage of glycerin.

A reaction equilibrium is apparently never reached in my process because of the continuous counterpassage of the fatty matter and water, so that the hydrolysis proceeds rapidly to substantial completion and the resulting "sweet water" contains a higher percentage of glycerin when withdrawn from the autoclave than has been possible to obtain in past practice in connection with obtaining a high degree of splitting of the fat.

It should be noted that in carrying out my process no mechanical agitation of any kind is used to facilitate the hydrolysis, and no baffles, trays, packing material, or other devices are needed in the autoclave to break up, interrupt, or retard the flow of the two fluids through same; while such devices do not prevent the operation of my process they retard same and reduce the capacity of an apparatus of a given size. In fact, the use of baffles is undesirable because the effect is to form constricted areas through which the fat would be required to move at considerably increased velocity. Any considerable velocity will entrain the comminuted water particles or drops, and may overcome the effect of gravity in causing them to descend, thus blocking the process.

It should be understood that while the apparatus described is suitable for carrying out my process, other forms of apparatus may be used provided they are suitable for continuous countercurrent action so as to keep water and fat in contact under suitable conditions of temperature and pressure until hydrolyzed.

It should also be understood that instead of having an ascending column of fat through which water percolates downward with an interface near the bottom of the column, as described, other arrangements may be used, and the interface may be maintained at other levels. I may, for example, have a descending column of water through which fat percolates upward with an interface near the top of the column.

A continuous autoclave system of the type and dimensions described is capable of splitting at least 180,000 pounds of fat such as tallow per twenty-four hours, under the described conditions of continuous operation at 470° F., which is equal to the output of about fourteen batch autoclaves, having a capacity of 10,000 pounds of fat each, of the type commonly used heretofore. My entire apparatus, together with its auxiliary tanks and pumps, etc., occupies only about one fifth the floor space required for the old type autoclaves with their necessary auxiliary equipment to handle the same amount of fat per twenty-four hours. While I can readily hydrolyze fats to as high as 98–99.5 per cent by my process, lower percentages are also obtainable if desired by passing the fat and water through the autoclave more rapidly, by using a reduced proportion of water, lower temperatures, or other known means. In referring to a "high degree of hydrolysis" in this specification and claims, I mean higher than about 95%.

The upward flow of fat must not be fast enough to prevent the water from falling downward through same at any point in the apparatus where the fat and water are flowing in countercurrent directions in contact with each other. The flow of fat may be faster with relatively large drops of water than with small drops without interfering with the falling of the water or without entraining excessive amounts of water.

The deaeration or deoxygenation of the fat and water is not essential to the success of the hydrolysis itself, but is important from a quality standpoint in obtaining the best quality of split fatty acids and glycerin.

Some of the essential features of my invention are the discovery that the rate of hydrolysis of fat either with or without a catalyst is dependent largely on the amount of water actually dissolved in the fat rather than on the amount of water that can be brought into surface contact with the fat; that large percentages of water can be made to dissolve in any fat under conditions of high temperature and pressure; that when the amount of water dissolved in the fat is considerable and the temperature sufficiently high, the rate of reaction is very high and mechanical agitation becomes unnecessary.

At ordinary room temperature and atmospheric pressure, neutral oils and fats will only dissolve about 0.1 per cent of water; fatty acids will dissolve somewhat more. As the temperature increases, however, the solubility likewise increases at an accelerating rate. Figure 2 gives curves showing the solubility of water in fatty acids of tallow and coconut oil at various temperatures, these fats being typical of the two principal classes of fats. At a temperature of about 470° F. as much as 11 per cent and 23 per cent of water is dissolved in tallow fatty acids and in coconut fatty acids, respectively. The fatty acids of most other common fats and oils, except those of the coconut class, have about the same solution capacity as tallow fatty acids. The coconut class includes palm kernel oil and other tropical oils of similar constitution, as is well known. The solubility of water in neutral fats is only slightly lower than in fatty acids, but is difficult or impossible to determine accurately because fats containing large amounts of dissolved water hydrolyze to fatty acids and glycerin with rapidity. For my purpose the data showing the solubility of water in fatty acids at different temperatures is sufficiently indicative.

Obviously in order to make possible the high degrees of solubility of water in fats without allowing the water to evaporate at these high temperatures, it is necessary to keep the materials under a correspondingly high pressure. It is readily seen that the intimate contact of water molecules with fat molecules and their potential reactivity are enormously increased when considerable portions of water are actually dissolved and distributed throughout the entire mass of fat than can possibly be the case when the water exists in a separate phase and is only brought into surface contact by agitation.

The temperatures which I use may vary from about 365° F. up to about 600° F. and pressures from about 150 pounds to about 1600 pounds per square inch and may, as reference to Fig. 2 shows, be as low as 300° with certain types of oils and fats, which absorb substantial proportions of water at said temperature. Temperature of about 350° F. to about 600° F. and pressures from about 125 pounds to about 1600 pounds are satisfactory, but I prefer temperatures in the range of about 365° F. to 470° F. with pressures ranging from about 150 pounds per square inch to 600 pounds per square inch. I find that at temperatures materially below 365° F. the reaction becomes much slower while at temperatures higher than about 470° F. the speed of reaction is not much greater than at 470° F.

The proportion of water to fat may be varied considerably, depending on the concentration of the glycerin and speed of reaction desired. It must be noted, however, that approximately 6 per cent of water is needed to complete the chemical reaction in which a neutral triglyceride fat of the tallow class is hydrolyzed to fatty acids and glycerin, and at my preferred operating temperature of about 470° F. approximately another 11 per cent of water dissolves in the fatty acids of tallow or similar fats thus causing an apparent disappearance of about 17 parts of water per 100 parts of fat. Additional water beyond this amount must be used. Thus if 10 parts of glycerin are to be set free by the hydrolysis and a 20% glycerin solution is desired, the additional water must then be 40 parts, or a total of 57 parts of water per 100 parts of fat of the tallow class. For fats of the coconut class there would be required under similar conditions about 8 parts of water for the chemical reaction (hydrolysis), 21 parts of water dissolved in the fatty acids, and 52 parts of water to form a 20% solution of the 13 parts (approximate) of glycerin to be liberated, or a total of 81 parts of water per 100 parts of fat of the coconut class.

The glycerin concentration of the "sweet water" may be regulated within reasonable limits, meaning substantially 20 to 50 per cent, by regulating the proportion of water used for a given amount of fat containing a substantial amount of glycerin according to the following formula:

$$W = SY + \frac{(X)(54)}{92} + \frac{X}{C} - X$$

in which W represents the pounds of water to be used in proportion to each 100 pounds of fat; S, the pounds of water soluble in 100 pounds of fatty acids at the operating temperature, as shown in the curves of Figure 2; Y is a decimal representing the proportion of water-insoluble fatty acids contained in the fat (approximately .95 for most fats of the tallow class, and approximately .90 for most fats of the coconut class but varying somewhat according to the amount of water used in the analytical procedure); X, the pounds of glycerin liberated by the hydrolysis from 100 pounds of fat; and C, the pounds of glycerin in one pound of "sweet water", varying between 0.20 and 0.50. The figure 54 represents the molecular weight of three molecules of water, and the figure 92 is the molecular weight of glycerin, the chemical reaction of hydrolysis requiring three molecules of water for each molecule of glycerin set free.

The rate of flow of the fat through the apparatus may be increased to some extent, provided the previously mentioned limit is not exceeded without decreasing the percentage of splitting by simultaneously increasing the proportion of water, but this will necessarily result in a less concentrated "sweet water". The best rate for maximum hydrolysis will necessarily vary with the height and diameter of the autoclave.

In treating lower grade fats containing less than their full complement of glycerin (as shown by a higher percentage of free fatty acids), the "sweet water" will naturally contain lower percentages of glycerin if the proportion of water to fat remains unchanged. Oils of the coconut class contain about 13 to 14 per cent of combined glycerin when neutral, and oils or fats of the tallow class about 10 to 11 per cent. Where "a substantial amount" of combined glycerin is mentioned, I mean about one quarter or more of the amount normally present in a neutral fat of that kind.

Other means of cooling the "sweet water" and the fat than by flashing same to atmospheric pressure may be used if desired. Heat exchangers or cooling coils, of course, could be used, but I find that cooling by flashing is economical and desirable as a means of removing a portion of the water.

When the fatty acids and the "sweet water" are cooled by flashing to atmospheric pressure, as described, the steam thus formed is allowed to escape through an opening at the top of the tank, but in doing so forms a sort of blanket over the fatty acids and the "sweet water", respectively, thus excluding air which might cause injury to same.

The advantage of obtaining a more concentrated "sweet water" than heretofore lies mainly in the saving in steam or in heat and in the equipment and operating cost for the concentration of the "sweet water" into crude glycerin. In the practice of the prior art the glycerin content of the "sweet water" was generally about 15 per cent, thus leaving 83 per cent or about 5.55 pounds of water which must be evaporated for each pound of glycerin to obtain crude glycerin containing 90 per cent actual glycerin, while in the practice of my process in which the concentration of the "sweet water" may for example be about 35 per cent (which is a reliable average figure), the amount of water which must be evaporated is only about 61 per cent, or 1.75 pounds for each pound of glycerin.

As catalysts for my process, any of those commonly known and used for splitting fats may be used, such as the oxides or soaps of zinc, calcium and magnesium, but I prefer zinc soap which may be made by dissolving zinc oxide in about seven times its weight of hot fatty acids, such as tallow fatty acids for example. The amount required for efficient operation is usually less than one per cent, figured as zinc oxide, on the weight of fat used; 0.25 per cent is commonly sufficient for good grades of fat.

It is understood that while the hydrolysis of tallow has been mentioned specifically herein, other fats and fatty materials are equally susceptible to the application of my process and I am in no way limited to the use of any particular kind of fat or fatty matter. Fatty matter containing any proportion of neutral fat and free fatty acids may be used.

Having thus described my invention, what I claim as new and desire to secure by Letters Patent is:

1. A continuous process for hydrolyzing fat which comprises establishing an upwardly flowing column of fat, heated to at least 350° F., in a suitable chamber under sufficient pressure to maintain water at said temperature in the liquid state, and causing water at said temperature to percolate downwardly in comminuted form through said rising column of fat, the heat stored in the said fat and water before contacting each other being sufficient to cause the subsequent hydrolysis, continuously removing hydrolyzed fat from the top of the chamber and continuously removing water with glycerin from the bottom of the chamber, the total proportion of water to fat being sufficient to provide an excess of unreacted and undissolved liquid water equal to at least the weight of glycerin to be liberated, the period of contact of fat with water being at least 30 minutes, and the rate of flow of the fat being below that which will entrain the water and inhibit its fall by gravity therethrough.

2. A continuous process of hydrolyzing fat comprising separately heating fat and water to a temperature between 365° and 600° F., under a pressure between 150 and 1600 pounds per square inch sufficient to keep the water liquid at a temperature used, and said fat being subjected to substantially the same high pressure before contacting said water, passing both fat and water at substantially said high temperature and pressure continuously in a countercurrent direction in contact with each other through a suitable chamber whereby a substantial portion of water dissolves in said fat, the total proportion of water to fat being sufficient to provide a substantial excess of liquid water throughout the operation, the period of contact of fat with water in said chamber being sufficient to cause a substantial splitting of glycerin from the fatty acids.

3. A continuous process of hydrolyzing fat comprising separately heating fat and water to a temperature between 365° and 600° F., under a pressure between 150 and 1600 pounds per square inch sufficient to keep the water liquid at the temperature used, and said fat being subjected to substantially the same high pressure before contacting said water, passing both fat and water at substantially said high temperature and pressure continuously in a countercurrent direction in contact with each other, and with a catalyst suitable for fat splitting, through a suitable chamber, whereby a substantial portion of water dissolves in said fat, the total proportion of water to fat being sufficient to provide a substantial excess of liquid water throughout the operation, the period of contact of fat with water in said chamber being sufficient to cause a substantial splitting of glycerin from the fatty acids.

4. A continuous process of hydrolyzing fat comprising separately heating fat and water to substantially 470° F., said water being maintained in the liquid condition by heating under a pressure of substantially 600 pounds per square inch, and said fat being subjected to substantially the same high pressure before contacting said water, passing both fat and water at substantially said high temperature and pressure continuously in a countercurrent direction in contact with each other and with a catalyst selected from the group consisting of zinc soap, calcium soap and magnesium soap, through a suitable chamber, whereby a substantial portion of the water dissolves in said fat, the total proportion of water to fat being sufficient to provide a substantial excess of liquid water throughout the operation, the period of contact of fat with water in said chamber being sufficient to cause a substantial splitting of the glycerin from the fatty acids.

5. A continuous process of hydrolyzing fat comprising separately heating fat and water to a temperature between 365° and 600° F., under a pressure between 150 and 1600 pounds per square inch sufficient to keep the water liquid at the temperature used, and said fat being subjected to substantially the same high pressure before contacting said water, passing both fat and water at substantially said high temperature and pressure continuously in a countercurrent direction in contact with each other and with a catalyst selected from the group consisting of zinc soap, calcium soap and magnesium soap in amount equivalent to about one quarter per cent of the respective metal oxide based on the fat used, through a suitable chamber, whereby a substantial portion of water dissolves in said fat, the total proportion of water to fat being sufficient to provide a substantial excess of liquid water throughout the operation, the period of contact of fat with water in the autoclave chamber under said conditions being at least 30 minutes, whereby the fat is hydrolyzed to the extent of at least 98 per cent.

6. In hydrolyzing a fat containing a substantial amount of combined glycerin in accordance with the process described in claim 5, the step of regulating the glycerin concentration of the "sweet water" between substantially 20 per cent and 50 per cent by regulating the proportion of water to fat according to the following formula:

$$W = SY + \frac{(X)(54)}{92} + \frac{X}{C} - X$$

in which W represents the pounds of water per 100 pounds of fatty acids in the fat; S, the pounds of water soluble in 100 pounds of fatty acids at the operating temperature; Y is a decimal representing the proportion of water-insoluble fatty acids contained in the fat (approximately .95 for most fats of the tallow class, and approximately .90 for most fats of the coconut class but varying somewhat according to the amount of water used in the analytical procedure); X, the pounds of glycerin liberated by the hydrolysis of 100 pounds of fat; and C, the pounds of glycerin in one pound of "sweet water" varying between 0.20 and 0.50.

7. In hydrolyzing a fat containing a substantial amount of glycerin in accordance with the process described in claim 5, at a temperature of substantially 470° F. and pressure of substantially 600 pounds per square inch, the step of regulating the glycerin concentration of the "sweet water" by regulating the proportion of water to fat according to the following formula:

$$W = SY + \frac{(X)(54)}{92} + \frac{X}{C} - X$$

in which W represents the pounds of water per 100 pounds of fat; S, the pounds of water soluble in 100 pounds of fatty acids at the operating temperature; Y is a decimal representing the proportion of water-insoluble fatty acids contained in the fat (approximately .95 for most fats of the tallow class, and approximately .90 for most fats of the coconut class but varying somewhat according to the amount of water used in the analytic procedure); X, the pounds of glycerin liberated by the hydrolysis of 100 pounds of fat; and C, the pounds of glycerin in one pound of "sweet water" varying between 0.20 and 0.50.

8. A continuous process of hydrolyzing fat comprising deoxygenating and separately heating fat and water to a temperature between 365° and 600° F., under a pressure between 150 and 1600 pounds per square inch sufficient to keep the water liquid at the temperature used, and said fat being subjected to substantially the same high pressure before contacting said water, passing both fat and water at substantially said high temperature and pressure continuously in a countercurrent direction in contact with each other, and with a catalyst selected from the group consisting of zinc soap, calcium soap and magnesium soap, through a suitable chamber, whereby a substantial portion of water dissolves in said fat, the total proportion of water to fat being sufficient to provide a substantial excess of liquid water throughout the operation, the period of contact of fat with water in said chamber being sufficient to cause a substantial splitting of glycerin from the fatty acids.

9. A continuous process of hydrolyzing fat comprising separately heating fat and water to a temperature between 365° and 600° F., under a pressure between 150 and 1600 pounds per square inch sufficient to keep the water liquid at the temperature used, and said fat being subjected to substantially the same high pressure before contacting said water, passing both fat and water at substantially said high temperature and pressure continuously in a countercurrent direction in contact with each other, and with a catalyst selected from the group consisting of zinc soap, calcium soap and magnesium soap, through a suitable chamber, whereby a substantial portion of water dissolves in said fat, the total proportion of water to fat being sufficient to provide a substantial excess of liquid water throughout the operation, the period of contact of fat with water in said chamber being sufficient to cause a substantial splitting of glycerin from the fatty acids, evaporating a portion of the water from the "sweet water" and from the liberated fatty acids by releasing the said materials from a condition of superatmospheric pressure and high temperature to atmospheric pressure, and protecting said fatty acids from exposure to the atmosphere by means of a blanket of steam.

10. The process of claim 2 which includes introducing the fat and water into an upwardly extending chamber at different levels above and below its ends respectively, and continuously drawing off the fatty acids from the chamber above the point of water introduction, and the "sweet water" from the chamber below the point of fat introduction.

11. The process of claim 2 which includes collecting the resulting fatty acids beyond the water inlet and the resulting "sweet water" beyond the fat inlet without drop in pressure, and continuously drawing off said fatty acids and "sweet water", and flashing the same in suitable chambers to permit escape of water vapor and by said vapor to protect the flashed material from the atmosphere.

12. A continuous process of hydrolyzing fat without substantial darkening comprising deoxygenating and separately heating fat and water to a temperature between 365° and 660° F., under a pressure between 150 and 1600 pounds per square inch sufficient to keep the water liquid at the temperature used, and said fat being subjected to substantially the same high pressure before contacting said water, passing both fat and water at substantially said high temperature and pressure continuously in a countercurrent direction in contact with each other, and with a catalyst selected from the group consisting of zinc soap, calcium soap and magnesium soap, through a suitable chamber, whereby a substantial portion of water dissolves in said fat, the total proportion of water to fat being sufficient to provide a substantial excess of liquid water throughout the operation, the period of contact of fat with water in said chamber being sufficient to cause a substantial splitting of glycerin from the fatty acids.

13. The continuous process of hydrolyzing glycerides of the higher fatty acids comprising separately heating the glyceride and water to a temperature above about 365° F., said water being maintained in liquid condition by a pressure substantially above the saturation pressure of steam at the highest temperature employed, and said fat being subjected to substantially the same high pressure before contacting the water, passing both the glyceride and water at substantially said high temperature and pressure, but below ranges where only one phase would result, continuously in a countercurrent direction in intimate contact with each other through a chamber, the proportion of water to glyceride being sufficient to provide a substantial excess of liquid water throughout the operation, the period of contact of the glyceride with water in said chamber being sufficient to cause a substantial splitting of the glycerin from the fatty acids.

14. The continuous process of hydrolyzing glycerides of the higher fatty acids comprising separately heating the glyceride and water to a temperature of about 470° F. and at a pressure of at least 600 pounds per square inch and sufficient to keep the water liquid, passing both the glyceride and water at substantially said aforesaid temperature and pressure continuously in a countercurrent direction in intimate contact with each other through a chamber, the proportion of water to glyceride being sufficient to provide a substantial excess of liquid water throughout the operation, the period of contact of the glyceride with water in said chamber being sufficient to cause a substantial splitting of the glycerine from the fatty acids.

15. A continuous process for hydrolyzing fat which comprises separately heating fat and water to a temperature between about 350° F. and about 600° F., said water being maintained in the liquid condition by heating under a suitable pressure, and said fat being subjected to substantially the same high pressure before contacting said water, establishing in a suitable chamber an upwardly flowing column of said fat and causing said water to percolate downwardly in comminuted form through said ascending column of fat, the heat stored in said fat and water before contacting each other being sufficient to cause hydrolysis, continuously removing hydrolyzed fat from the top of the chamber and continuously removing water with glycerin from the bottom of the chamber, the total proportion of water to fat being sufficient to provide an excess of unreacted and undissolved liquid water equal at least to the weight of glycerin to be liberated, the period of contact of fat with water being at least 30 minutes and the rate of flow of the fat being below that which will entrain the water and inhibit its fall by gravity therethrough.

16. A continuous process of hydrolyzing fat comprising separately heating fat and water to substantially 470° F. under a pressure sufficient to maintain said water in the liquid condition, passing said fat and water continuously in a countercurrent direction through a suitable vertical chamber, in contact with each other and with a catalyst consisting of zinc soap in an amount equivalent to approximately one quarter per cent of zinc oxide based on the fat used, whereby a substantial portion of the water dissolves in said fat, the total proportion of water to fat being sufficient to provide a substantial excess of liquid water throughout the operation, the period of contact of fat with water in said chamber being at least approximately one hour.

17. The process of claim 2 which includes introducing the fat and water into an upwardly extending chamber at different levels above and below its ends respectively, causing the water to percolate downwardly in comminuted form through the ascending column of fat, and continuously drawing off the fatty acids from the chamber above the point of water introduction and the "sweet water" from the chamber below the point of fat introduction.

18. The method of hydrolyzing fats and fatty oils which comprises initially heating fat and water to a temperature of at least 365° F., and then intimately contacting such fatty material with water by countercurrent flow, at the said temperature, said water being maintained in liquid condition by a pressure substantially above the saturation pressure of steam at the highest temperature employed, whereby the fatty material will dissolve water in amounts substantially in excess of the amount required to hydrolyze the fatty material while maintaining two liquid phases, the water being used in amounts sufficient to supply that required for hydrolysis, that dissolved in the fatty material, and that required to wash out and remove the glycerin from the fatty material as aqueous glycerin.

VICTOR MILLS.